A. W. MARMON.
COTTON HARVESTER.
APPLICATION FILED SEPT. 15, 1920.
1,403,433.
Patented Jan. 10, 1922.
2 SHEETS—SHEET 1.
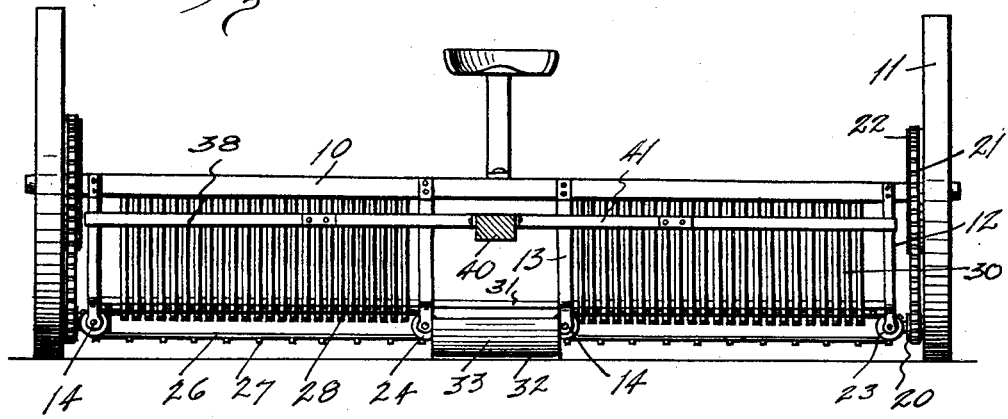
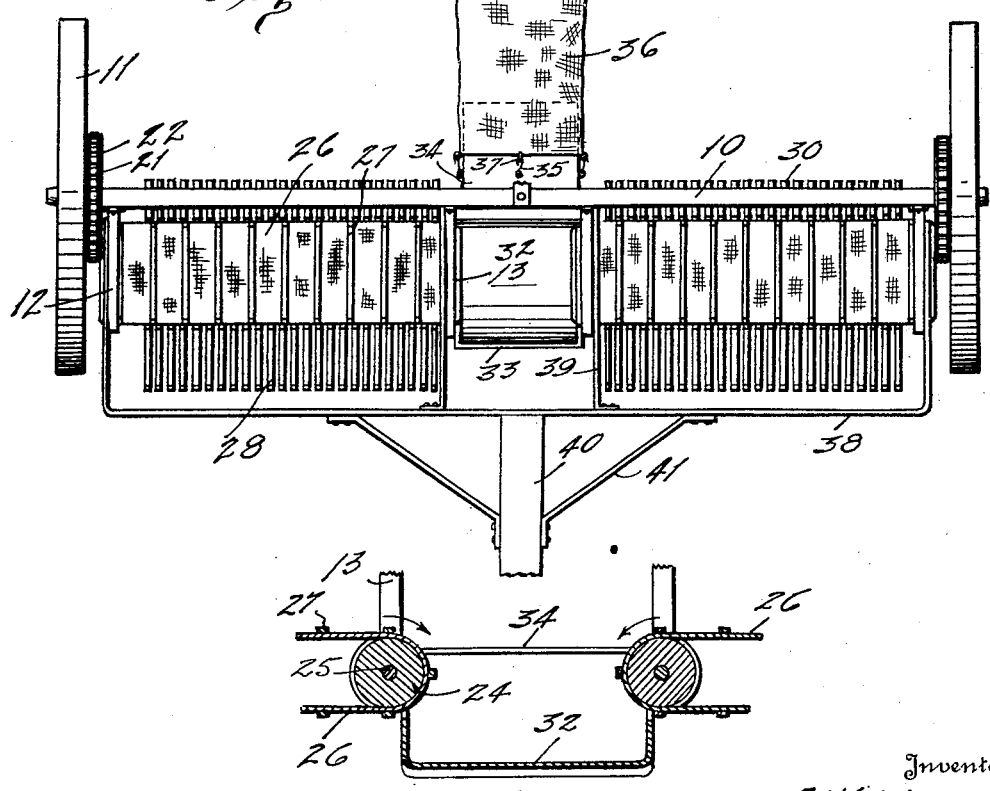
Inventor
A. W. Marmon.
By Jack A. Ashley
Attorney

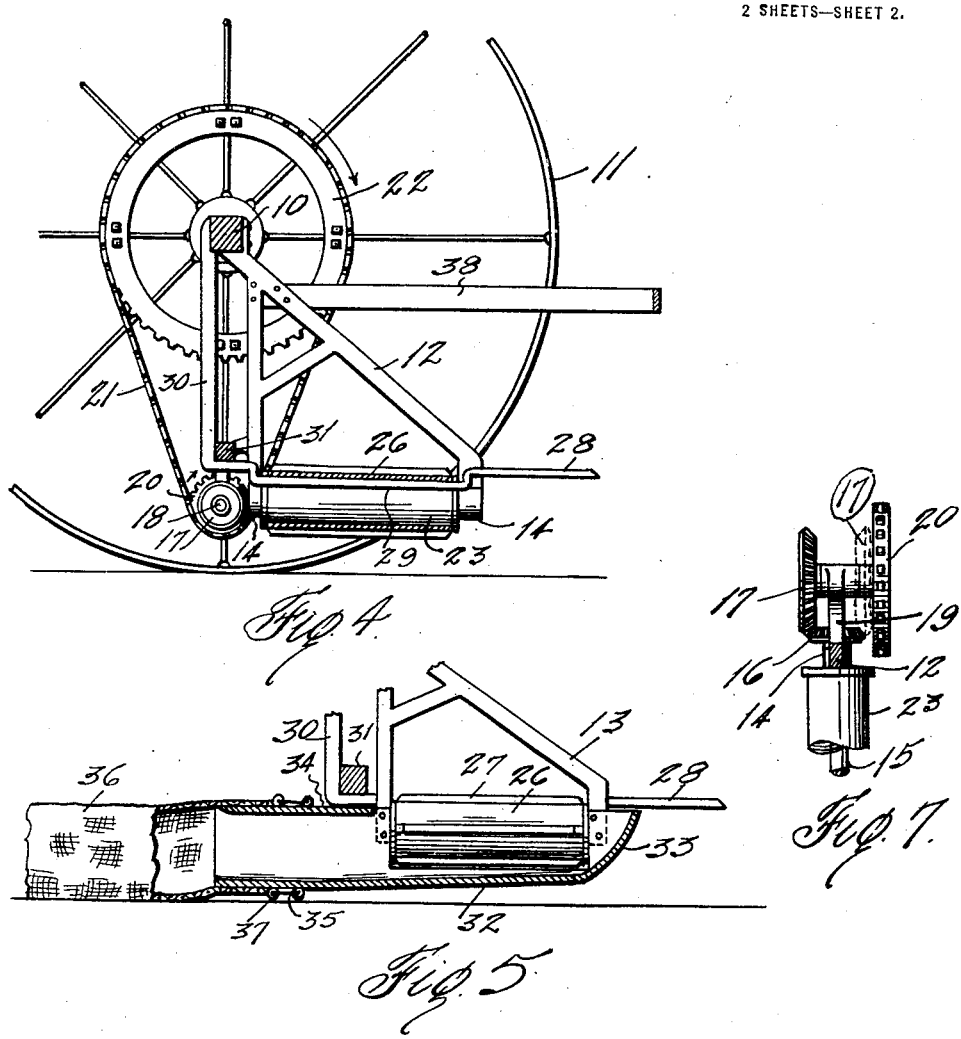

UNITED STATES PATENT OFFICE.

ALBERT W. MARMON, OF DALLAS, TEXAS, ASSIGNOR OF ONE-THIRD TO G. G. WARREN AND ONE-THIRD TO W. S. EDSON, BOTH OF DALLAS, TEXAS.

COTTON HARVESTER.

1,403,433.   Specification of Letters Patent.   Patented Jan. 10, 1922.

Application filed September 15, 1920. Serial No. 410,511.

*To all whom it may concern:*

Be it known that I, ALBERT W. MARMON, a citizen of the United States, residing at Dallas, in the county of Dallas and State of Texas, have invented certain new and useful Improvements in Cotton Harvesters, of which the following is a specification.

This invention relates to new and useful improvements in cotton harvesters.

The purpose of the invention is to provide means for gathering unopened, partially opened and matured cotton bolls and collecting the same in a suitable receptacle.

In carrying out the invention two sets or series of tines are mounted on a wheel support so as to be presented to the cotton plants. An endless conveyer is disposed so as to receive the bolls gathered by each set of tines and convey the same to the center of the harvester. A receiving hopper is arranged between the conveyers for receiving the cotton therefrom and a sack may be attached to the rear end of the hopper for collecting the cotton. The tines have their portions in advance of the conveyers arranged so that the upper surfaces of said portions will be at a higher elevation than the surface of the conveyers, thus permitting the bolls to fall onto the conveyers from the rear ends of said tine portions. Other novel features will be hereinafter more particularly pointed out.

The invention will be more readily understood from a reading of the following specification and by reference to the accompanying drawings, in which an example of the invention is shown, and wherein:

Fig. 1 is a front elevation of a cotton harvester constructed in accordance with my invention, Fig. 2 is a plan view of the same, Fig. 3 is a sectional detail showing the discharge ends of the conveyers and the collecting hopper, Fig. 4 is a transverse vertical sectional view, Fig. 5 is a transverse sectional detail of the collecting hopper, Fig. 6 is a perspective view of some of the tines, and Fig. 7 is a detail of one of the device connections.

In the drawings the numeral 10 designates a transverse axle supported at each end in ground wheels 11. Triangular hangers 12 depend from each end of the axle. Like hangers 13 depend from the axle on each side of the center of the harvester. Each hanger is suitably braced and extends forwardly. At the lower ends of the hangers bearing boxes 14 are provided, each hanger having a bearing box at its forward end and one at its rear end.

A drive shaft 15 is mounted in the boxes of the hangers 12 and carries a bevel pinion 16 on its rear end. Each pinion meshes with a bevel gear 17 mounted on a counter shaft 18 supported in a bearing bracket 19 depending from the rear side of the adjacent hanger. On the outer end of each shaft, a sprocket wheel 20 is fastened. On each ground wheel 11 a large sprocket 22 is suitably fastened and drives a sprocket chain 21, which drives the sprocket wheel 20 therebelow.

As indicated in dotted lines in Fig. 7, the gear 17 at one side of the harvester must engage with the opposite side of the pinion 16 with relation to the gear at the opposite side of the harvester, in order to revolve toward the center thereof. On each shaft 15 a roller 23 is fastened between the boxes 14 on the lower ends of the hangers 12. Similar rollers 24 have shafts 25 extending from their ends and engaging in the boxes 14 of the central hangers 13. Each roller 23 supports the outer end of an endless belt 26, while the inner end of said belt is supported by the adjacent roller 24. These conveyer belts travel laterally or outwardly from the center of the harvester and each has transverse slats 27 projecting upwardly and spaced apart.

In front of each belt a set of tines 28 project forwardly at substantially right angles to the length of the belt. The tines extend rearwardly and each has an angular depending off-set 29 under the upper length of the belt associated therewith. The off-set of each set of tines form a channel or trough for the upper length of the belt, so that the latter will be below the upper surfaces of those portions of the tines which project forwardly thereof. The tines extend rearwardly of the belt and each is attached to the lower end of an upright bar 30 which has its upper end secured to the rear side of the axle 10. A transverse brace bar 31 is received in the angle formed at the intersection of the tines and bars 30 and is fastened thereto, so as to space the tines apart and hold them so spaced.

The tines project some distance in advance of the belt and by reason of the hangers are carried at a suitable elevation from the ground. It has been found that in some fields the tines may pass within seven inches of the ground in order to gather the bolls at the bottom of the plants. It will be seen that the tines will pass through the plants and the bolls will be caught in top thereof, the stems passing between the tines as is indicated in Fig. 6. In this way the bolls will be broken from the plants and carried rearwardly on the tines as the harvester moves forwardly. The bolls and cotton will fall from the tines onto the belts which will convey them to the center of the harvester. The arrangement of the belts in the channels of the tines is important as it assures a proper delivery onto the belts. The upright bars 30 form a guard so that any bolls or cotton working off the rear edges of the belts will not be lost.

The hangers 13 at the center of the harvester are spaced apart sufficiently to support a depending collecting hopper 32, preferably formed of sheet metal and having its front end 33 closed and curved upwardly so as to pass over obstructions. The bottom of the hopper is inclined rearwardly as is shown in Fig. 5. The inner ends of the belts 26 project into the hopper so as to discharge freely into the same. In rear of the hangers 13 the hopper has a top 34 and is provided with hooks 35 or other fastenings on its top, sides and bottom. The rear end of the hopper is inserted in the mouth of an ordinary cotton picking sack 36. The sack has eyes 37 which are engaged by the hooks and the sack thus held on the hopper. When the harvester is drawn through the field the sack trails behind the same as it does when used by a hand picker.

A yoke shaped member 38 has its rear ends secured to hangers 13; while its central portion is supported by bars 39 extending rearwardly to the hangers 13. This member projects forwardly of the tines and is elevated above the same. A tongue 40 is fastened at the center of the member by braces 41, diverging therefrom and secured to the member 38.

In using the harvester it is drawn through the field by a team or other means, the sack trailing in the furrow between the rows. The tines 28 pass through the plants and are low enough to get under the lowest bolls. As the harvester moves forwardly the tines pull the unopened, partially opened and open bolls from the plants and these fall off the tines onto the belts 26. The belts carry the gathered products to the center of the harvester and discharge the same into the collecting hopper 32 from which they pass rearwardly into the sack 36. If necessary the driver may push the bolls and cotton back into the sack.

What I claim, is:

1. In a cotton harvester, a wheeled support, a plurality of forwardly directed tines carried by the support, a pair of conveyor belts traveling over the tines toward the center of the harvester, a collecting hopper disposed between the inner ends of the belts and receiving the discharge therefrom, and a collecting receptacle connected with the hopper.

2. In a cotton harvester, a wheeled support, a plurality of forwardly directed tines carried by the support, a pair of conveyor belts traveling over the tines toward the center of the harvester, a collecting hopper disposed between the inner ends of the belts and receiving the discharge therefrom, and a collecting receptacle connected with the hopper, said tines depending from the support in comparatively close proximity to the ground.

3. In a cotton harvester, a wheeled support, a plurality of spaced tines extending longitudinally of the direction of travel of the wheeled support and projecting forwardly, each tine having a portion thereof disposed rearwardly of its forward end bent downwardly for forming a channel, said channels forming a passage extending transversely of said tines, and a conveyor belt having its upper length travelling in said passage, whereby said conveyor length does not extend above the upper surfaces of said tines.

4. In a cotton harvester, a wheeled support, a plurality of spaced tines connected with the support and extending longitudinally of the direction of travel thereof and projecting forwardly, each tine being provided in its rear portion with a channel formed upon its upper side, said channels forming a passage extending transversely of said tines, a conveyor belt having its upper length travelling in said passage whereby the upper surface of said upper length does not extend above the upper surface of the forward portions of said tines, a hopper carried at one end of the conveyor belt, and means to drive the conveyor belt so that its upper length travels toward said hopper.

5. In a cotton harvester, a wheeled support, two sets of spaced tines carried by the support and extending longitudinally of the direction of travel thereof and projecting forwardly, the two sets having their inner ends spaced, and the tines in each set being spaced, each tine in each set being provided in its rear portion with a channel formed in the top thereof, the channels in each set constituting a passage extending transversely of each set of tines, conveyor belts extending transversely of the wheeled support and having their upper lengths disposed within said passage whereby the upper surface of the conveyor belts do not extend above the upper surface of the tines, means to drive the conveyor belts in opposite directions so that their upper lengths travel inwardly, and a hopper disposed between the inner ends of the two sets of tines.

6. In a cotton harvester, a transverse axle, ground wheels supporting the axle, hangers depending from the axle, spaced tines extending longitudinally of the direction of travel of the harvester and projecting forwardly and having depending members at their rear ends which are supported by the axle, said members forming guards, conveyor belts extending longitudinally of the axle and supported by the hangers with their upper lengths extending over the rear portions of the tines, the forward portions of the tines extending forwardly beyond the conveyor lengths, means for driving the conveyor belts from the ground wheels so that the upper lengths of the conveyor belts travel inwardly, and a hopper for receiving material from the inner end of the conveyor belts.

7. In a cotton harvester, a wheeled frame, sets of spaced tines carried by the frame and extending longitudinally of the direction of travel thereof, the inner ends of said sets being spaced, conveyor belts carried by the frame and having their upper lengths operating over the rear portions of the sets of tines with the forward portions of said tines projecting forwardly beyond the conveyor belts for a substantial distance, and a hopper arranged adjacent the inner ends of the conveyor belts.

8. In a cotton harvester, an axle, ground wheels supporting the axle, hangers depending from the axle, sets of tines depending from the axle and extending forwardly, the sets being spaced at their inner ends and the tines in each set being spaced, conveyor belts extending longitudinally of said axle and having their upper lengths operating over the rear portions of said tines and the forward portions of said tines projecting forwardly beyond said lengths, means to drive the conveyor from the ground wheels, a hopper arranged near the inner ends of said belts, and a sack attached to the hopper.

In testimony whereof I affix my signature.

ALBERT W. MARMON.